(12) United States Patent
Erickson et al.

(10) Patent No.: US 10,368,551 B2
(45) Date of Patent: Aug. 6, 2019

(54) SYSTEM AND METHOD FOR BREAKING SHEETS OF FROZEN PIZZA INTO INDIVIDUAL PIECES

(71) Applicant: General Mills, Inc., Minneapolis, MN (US)

(72) Inventors: Robert Erickson, Crystal, MN (US); Lily Leung Fee, St. Anthony, MN (US); Anita J. Hall, Bloomington, MN (US); Darin T. Huffman, Minneapolis, MN (US); Rodney McCalley, Eden Prairie, MN (US); Terry G. Reishus, Eagan, MN (US); Steve J. Schoo, Maple Grove, MN (US); Ralph A. Stenvik, Plymouth, MN (US)

(73) Assignee: General Mills, Inc., Minneapolis, MN (US)

( * ) Notice: Subject to any disclaimer, the term of this patent is extended or adjusted under 35 U.S.C. 154(b) by 335 days.

(21) Appl. No.: 15/057,501

(22) Filed: Mar. 1, 2016

(65) Prior Publication Data

US 2017/0251678 A1     Sep. 7, 2017

(51) Int. Cl.
*A21C 15/04* (2006.01)
*B26F 3/00* (2006.01)
*A21D 13/41* (2017.01)

(52) U.S. Cl.
CPC ............. *A21C 15/04* (2013.01); *A21D 13/41* (2017.01); *B26F 3/002* (2013.01); *Y10T 225/14* (2015.04); *Y10T 225/325* (2015.04)

(58) Field of Classification Search
CPC ............. Y10T 225/14; Y10T 225/329; Y10T 225/321; Y10T 225/325; Y10T 225/307; Y10T 225/314; Y10T 225/371; Y10T 225/379; A21C 15/04; A21C 5/003; A21C 5/00; A21C 5/02–08; A21C 14/00; C03B 33/03; C03B 33/033; C03B 33/0207;
(Continued)

(56) References Cited

U.S. PATENT DOCUMENTS 168,531 A    10/1875   Ruger
760,417 A     5/1904   Budd, Jr.
(Continued)

FOREIGN PATENT DOCUMENTS

JP    WO 2009133832 A1 * 11/2009 ............ B28D 1/225

OTHER PUBLICATIONS

Definition of "cam" accessed at https://www.merriam-webster.com/dictionary/cam on Oct. 18, 2017.*

*Primary Examiner* — Evan H Macfarlane
(74) *Attorney, Agent, or Firm* — Diederiks & Whitelaw, PLC; John L. Crimmins, Esq.

(57) ABSTRACT

A system and a method include breaking a sheet of frozen pizza into individual pieces for packaging. In an embodiment, the frozen pizza sheet includes five individual pieces separated by frangible lines. The breaking process includes a first step, wherein two end pieces are broken off by a first breaking mechanism, and a second step, wherein two additional end pieces are broken off a remainder of the frozen pizza sheet by a second breaking mechanism arranged downstream of the first breaking mechanism. In preferred embodiments, each breaking mechanism includes multiple holding wheels and multiple camming wheel rotatably mounted on a common driven axle.

21 Claims, 7 Drawing Sheets

(58) Field of Classification Search
CPC .... C03B 33/023; B26F 2210/00; B26F 3/002; A21D 13/41; A21D 13/43; A21D 13/45
USPC .......... 99/537; 426/518, 503; 125/23.02, 24; 65/97
See application file for complete search history.

(56) References Cited

U.S. PATENT DOCUMENTS

| | | | |
|---|---|---|---|
| 1,401,268 A * | 12/1921 | Manischewitz | A21C 15/04 |
| | | | 12/146 B |
| 2,047,472 A | 7/1936 | Hotchkiss | |
| 2,150,391 A * | 3/1939 | Morris | C03B 33/04 |
| | | | 225/97 |
| 2,252,362 A | 8/1941 | Carus | |
| 2,252,363 A | 8/1941 | Carus | |
| 2,261,062 A | 10/1941 | Huber, Jr. et al. | |
| 2,555,916 A | 6/1951 | Clark | |
| 2,693,053 A * | 11/1954 | Eakin | B65G 49/068 |
| | | | 225/96.5 |
| 3,065,777 A * | 11/1962 | Allen | A23N 15/02 |
| | | | 99/537 |
| 3,268,135 A * | 8/1966 | Barradell-Smith | |
| | | | C03B 33/033 |
| | | | 225/2 |
| 3,490,503 A * | 1/1970 | Hill | B27D 5/00 |
| | | | 144/353 |
| 3,765,909 A | 10/1973 | Moline | |
| 4,018,372 A * | 4/1977 | Insolio | C03B 33/0235 |
| | | | 225/2 |
| 5,683,045 A * | 11/1997 | Staniszewski | B02C 18/0007 |
| | | | 225/97 |
| 6,783,782 B1 | 8/2004 | Larsen et al. | |
| 6,942,885 B2 * | 9/2005 | Ross | A21D 10/025 |
| | | | 426/128 |
| 9,004,899 B2 * | 4/2015 | Nagayama | B26D 1/255 |
| | | | 425/294 |
| 2007/0196540 A1 | 8/2007 | Kirksey et al. | |
| 2014/0130552 A1 * | 5/2014 | Hill | B28D 5/0029 |
| | | | 65/97 |
| 2015/0237874 A1 * | 8/2015 | Haas | A21C 15/04 |
| | | | 83/425.1 |

* cited by examiner

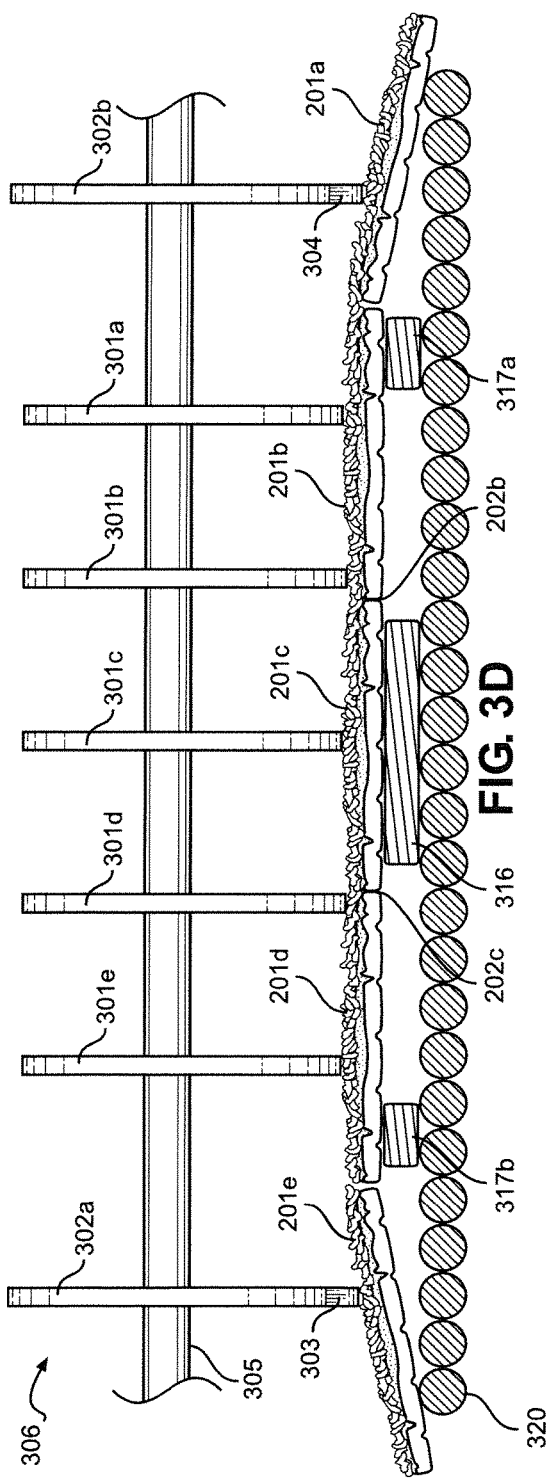
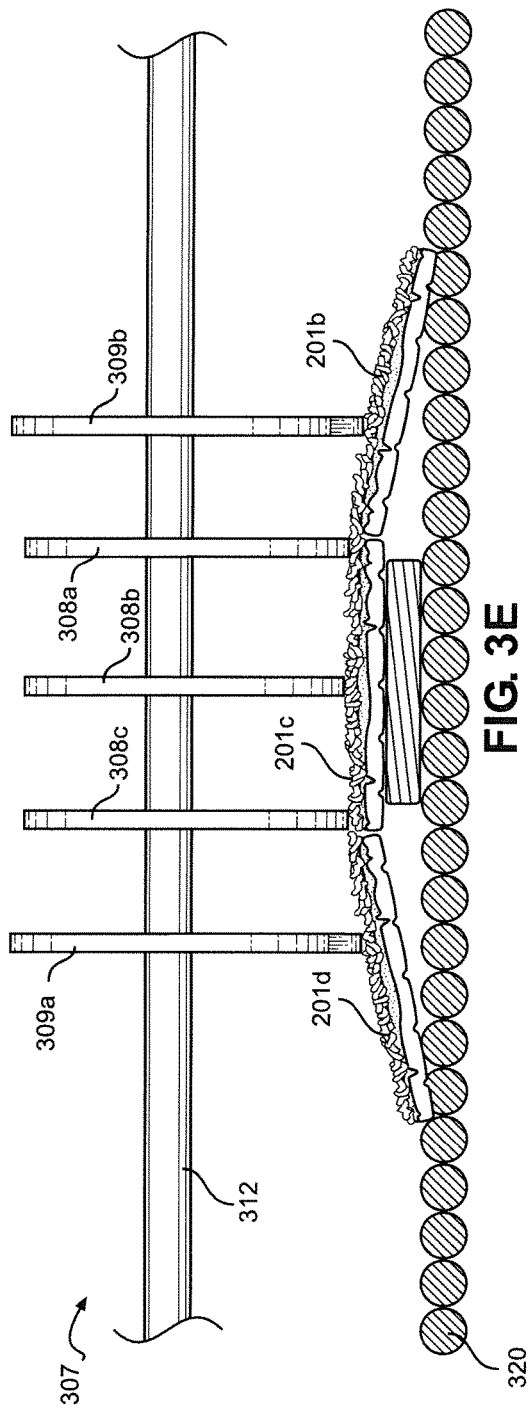
FIG. 3D
FIG. 3E

SYSTEM AND METHOD FOR BREAKING SHEETS OF FROZEN PIZZA INTO INDIVIDUAL PIECES

BACKGROUND OF THE INVENTION

This invention generally pertains to the art of food processing and, more particularly, to a system and a method for breaking individual pieces of frozen pizza from a single sheet containing multiple pieces of frozen pizza.

Frozen foods have allowed an enormous flexibility in production, preservation and transportation of food. By the virtue of modern freezing techniques, food items do not need to be cooked or produced immediately before consumption. Be it raw fruits and vegetables or prepared food, food items can be immediately frozen after harvesting or preparation and preserved for a long period of time. Once frozen, these food items can be transported over long distances to various distribution points such as grocery stores and supermarkets. Such flexibility has resulted in availability of various seasonal foods and vegetables all year long, and quick and convenient preparation of frozen pre-prepared food at home.

Pre-prepared frozen foods are always quick and convenient for the final preparation at home. One has to simply remove the food from the packaging and cook the food in a microwave or any other suitable oven. The food will be ready to enjoy within a matter of minutes. For more convenience, various frozen food products are sold with microwaveable/oven-safe containers within the food packaging. The food can be consumed directly from these containers after the heating/cooking has been completed. For all these reasons, frozen foods have been very popular with people with busy lifestyles. The procurement and preparation of ingredients, such as chopping, washing or mixing, and lengthy cooking times can be completely eliminated. Apart from a quick dinner at home, frozen foods are very popular as lunch at workplaces where lunch breaks are short. Due to their immense popularity, supermarkets and grocery stores carry several aisles of frozen foods.

Pizza is a ubiquitous prepared food item, its popularity shown by the vast number of pizza parlors in every town and city. Homemade pizza is particular popular in many households. However, it is cumbersome and time-consuming to prepare pizza at home. Furthermore, the preparation requires some preparation/cooking skills to make the dough of right consistency, to estimate the amount and proportion of various ingredients such as tomato sauce and toppings, to calibrate oven temperature at various stages of cooking, etc. For all these reasons, frozen pizza, wherein all of these aforementioned processes have already been undertaken using standard procedures, has become very popular.

Frozen pizza for retail sale is generally prepared in a factory setting using experimentally tested and proven methods. The amount of ingredients and the associate cooking process have been continually improved to give a flavorful and delicious product to the customer. Having said this, at least in the case of polygonal-shaped individual pizza pieces as opposed to a more conventional large round pizza pies particularly designed for feeding multiple individuals, it is not efficient to prepare the individual frozen pizza a single piece at a time. Instead it is much more efficient to prepare and freeze a sheet of the pizza and subsequently break apart the sheet to establish individual frozen pieces which then be packaged. By way of example, if prepared and frozen individually, pieces of pizza may jam, freeze together, and become disarranged when traveling through various stages of the production system.

Breaking off an individual piece from a frozen pizza sheet is aided by the brittleness of the frozen pizza. This breaking off process has been and certainly can be done manually, but this process, although considered quite effective in obtaining uniformly sized pieces, is time consuming and expensive. Therefore, the efficiency gain derived from preparing the pizza in a single sheet can be lost during the breaking process when done manually. With this in mind, there is a need for a mechanized system to effectively and efficiently accomplish the breaking of a frozen pizza sheet to individual pieces prior to packaging and shipping for sale to consumers.

SUMMARY OF THE INVENTION

This invention is directed to a system and method to fulfil the aforementioned necessity by having a mechanized system for breaking a frozen sheet of pizza into individual pizza pieces for subsequent packaging.

The system comprises at least one holding wheel and at least one cammed breaking wheel mounted for concurrent rotation on the same axle or shaft as the holding wheel. The breaking can be done in more than one step. In one embodiment, a frozen pizza sheet includes five individual pieces. The two end pieces on either end are broken off in a first step by a first breaking mechanism and the three center pieces are separated in a second step by a second breaking mechanism.

In one embodiment, the first breaking mechanism includes five holding wheels and two cammed breaking wheels disposed on either side of the five holding wheels. In another embodiment, the first breaking mechanism includes three holding wheels and two cammed wheels disposed on either side of the three holding wheels. The second breaking mechanism is arranged downstream of the first breaking mechanism. The second breaking mechanism includes three holding wheels and a pair of cammed breaking wheels disposed on either side of the three holding wheels.

During the first step, the holding wheels of the first breaking mechanism apply a downward pressure substantially on the three center pieces. Each cammed wheel applies a breaking pressure through its cam to a respective end piece. While the holding pressure restricts an upward movement of the pizza sheet, the breaking pressure causes end pieces to move downward. The frozen pizza, being brittle, breaks to accommodate the downward movement. To ensure that the breakage occurs at the right locations, one or more frangible lines are provided in the sheet of frozen pizza.

Cantilevered support is applied from the bottom to aid the breaking of the pizza. In other words, multiple horizontal bars are arranged parallel to the direction of motion. The pieces of the pizza to be broken off are cantilevered on at least one these horizontal bars. More particularly, these cantilevered support bars provide support to the pieces that are not broken off in that particular stage. This support counteracts the downward pressure provided by the holding wheels and restricts the vertical movement of the pieces that are not to be broken off. However, there is no restriction of vertical movement for the pieces that are to be broken off. Therefore, when a cam pushes an end piece downward, the motion is unrestricted and the end piece breaks off to accommodate this motion.

Additional objects, features and advantages of the invention will become more readily apparent from the following detailed description of preferred embodiments thereof when

BRIEF DESCRIPTION OF THE DRAWINGS

FIG. 3D illustrates a front elevational view of a first breaking mechanism included within system of FIG. 3A.

FIG. 3E illustrates a front elevational view of a second breaking mechanism, located downstream of first breaking mechanism of FIG. 3D, included within system of FIG. 3A.

DETAILED DESCRIPTION OF THE INVENTION

Figure 1:
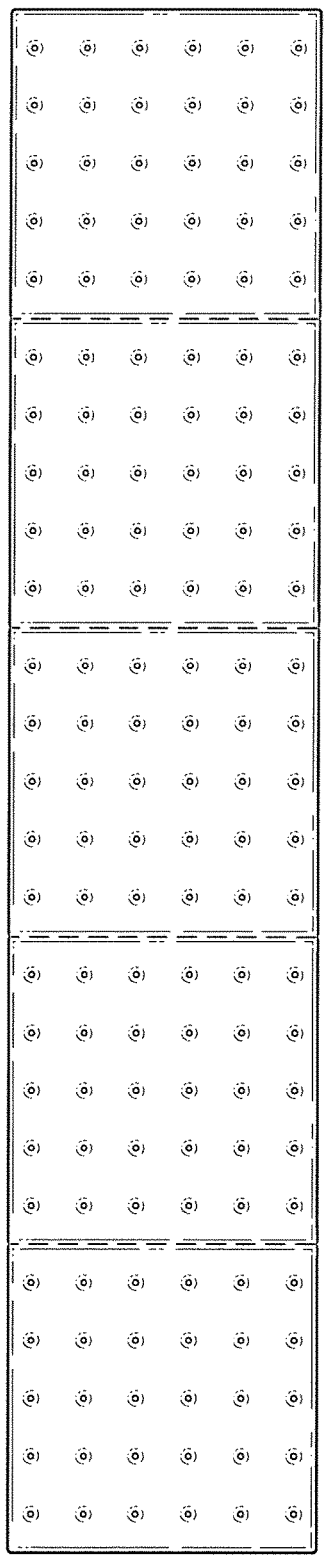
FIG. 1 illustrates a pizza crust used to produce frozen pizza pieces in accordance with the invention.

FIG. 1 illustrates an exemplary pizza crust 100 used to produce individual pieces of pizza according to the invention. In the embodiment depicted, the pizza crust is a five-pizza pieces wide, with each of the individual pizza pieces being polygonal in shape. For example, the pizza crust can constitute a 10 inch by 50 inch (25.4 cm×127 cm) slab which is divided in accordance with the invention to make five 10 inch by 10 inch (25.4 cm×25.4 cm) individual pizza pieces. However, as will become fully evident from the detailed description below, the number and size of the established individual pizza pieces can be readily varied in accordance with the invention.

Figure 2A:
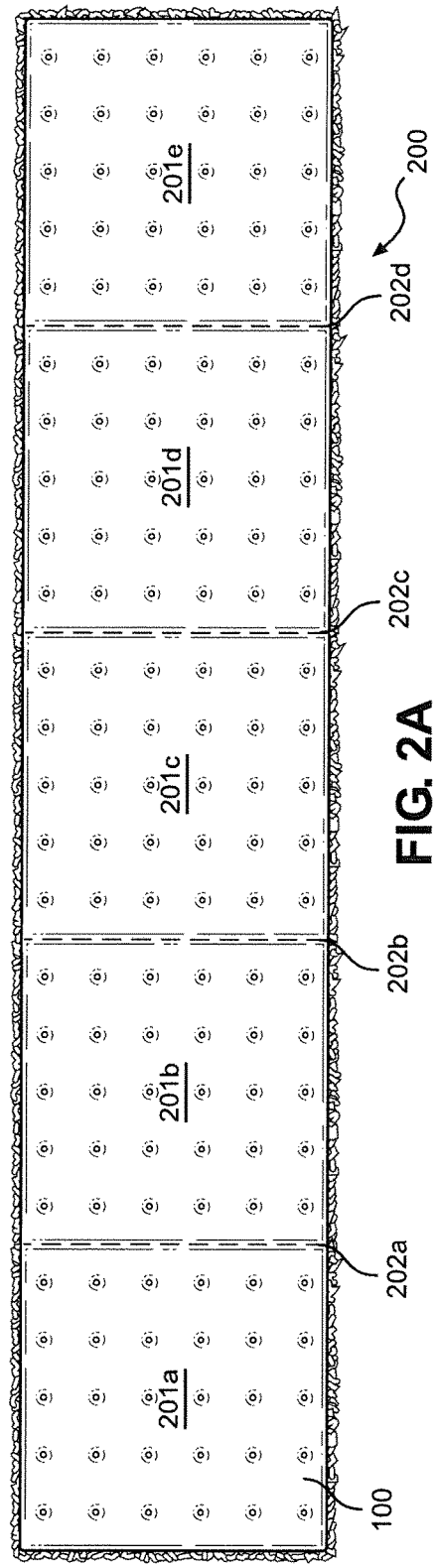
FIG. 2A illustrates a bottom view of a topped pizza sheet to be broken into individual pieces in accordance with the invention.
Figure 2B:
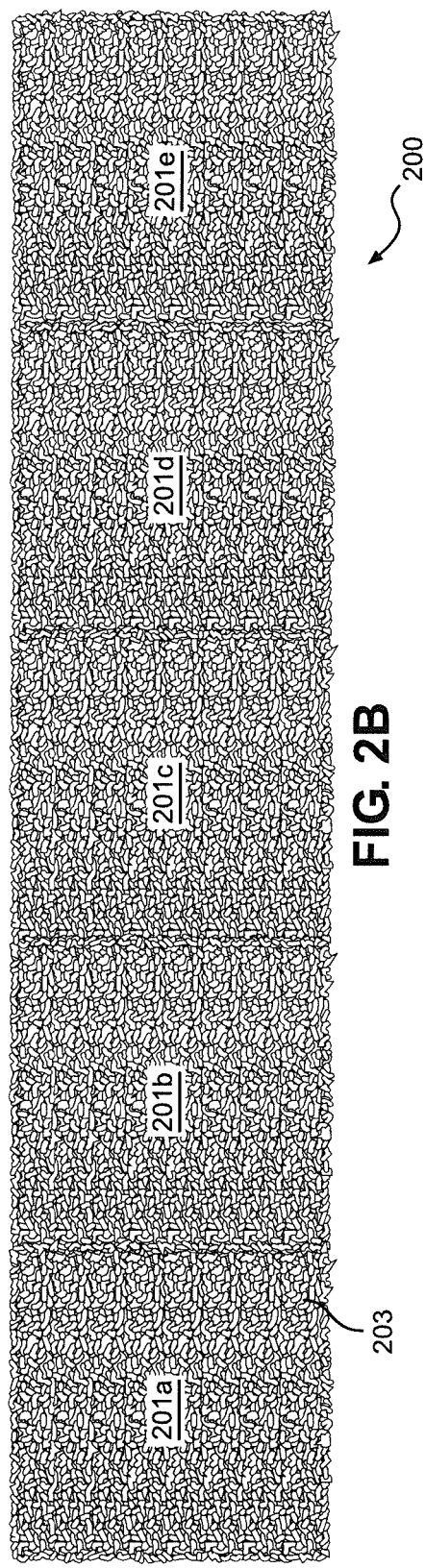
FIG. 2B illustrates a top view of the topped pizza sheet of FIG. 2A to be broken into individual pieces in accordance with the invention.

FIG. 2A illustrates a bottom view of five-pizza wide topped frozen pizza 200, while FIG. 2B illustrates a top view of the five-pizza wide topped frozen pizza 200. Frozen pizza 200 comprises of five pieces 201a, 201b, 201c, 201d and 201e. Various pizza toppings are illustrated as 203. Toppings 203 may include various types of cheese, vegetables, fruits and/or meat products. Individual pieces 201a, 201b, 201c, 201d and 201e are separated by frangible lines 202a, 202b, 202c and 202d respectively. Specifically, frangible line 202a separates pieces 201a and 201b; frangible line 202b separates pieces 201b and 201c; frangible line 202c separates pieces 201c and 201d; and frangible line 202d separates pieces 201d and 201e. In the embodiments depicted in FIGS. 2A and 2B, it is enough to have the frangible lines on the pizza crust. These frangible lines may be imparted on crust 100 before sauce and toppings 203 are added to crust 100. In other embodiments, the frangible lines may be imparted after pizza 200 has been frozen. It these embodiments, a portion of the thickness of frozen topping 203 may be made frangible as well, along with the aforementioned frangible lines in the crust 100.

Figure 2C:
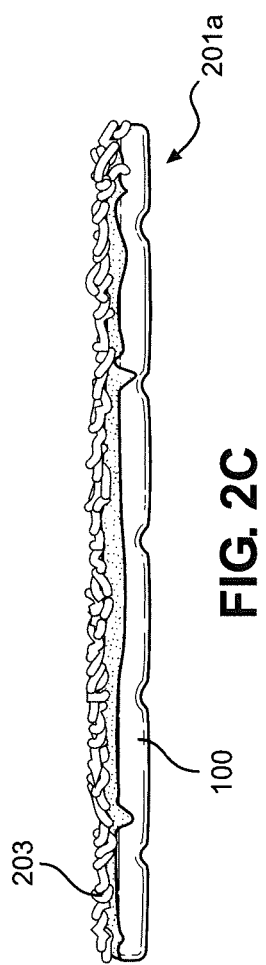
FIG. 2C illustrates a side view of an individual piece of pizza broken off from the pizza sheet in accordance with the invention.

FIG. 2C illustrates a side view of an individual piece of frozen pizza, for example piece 201a of FIGS. 2A and 2B. Individual piece 201a has been broken off from the pizza sheet 200 along frangible line 202a using the system and method disclosed herein.

Figure 3A:
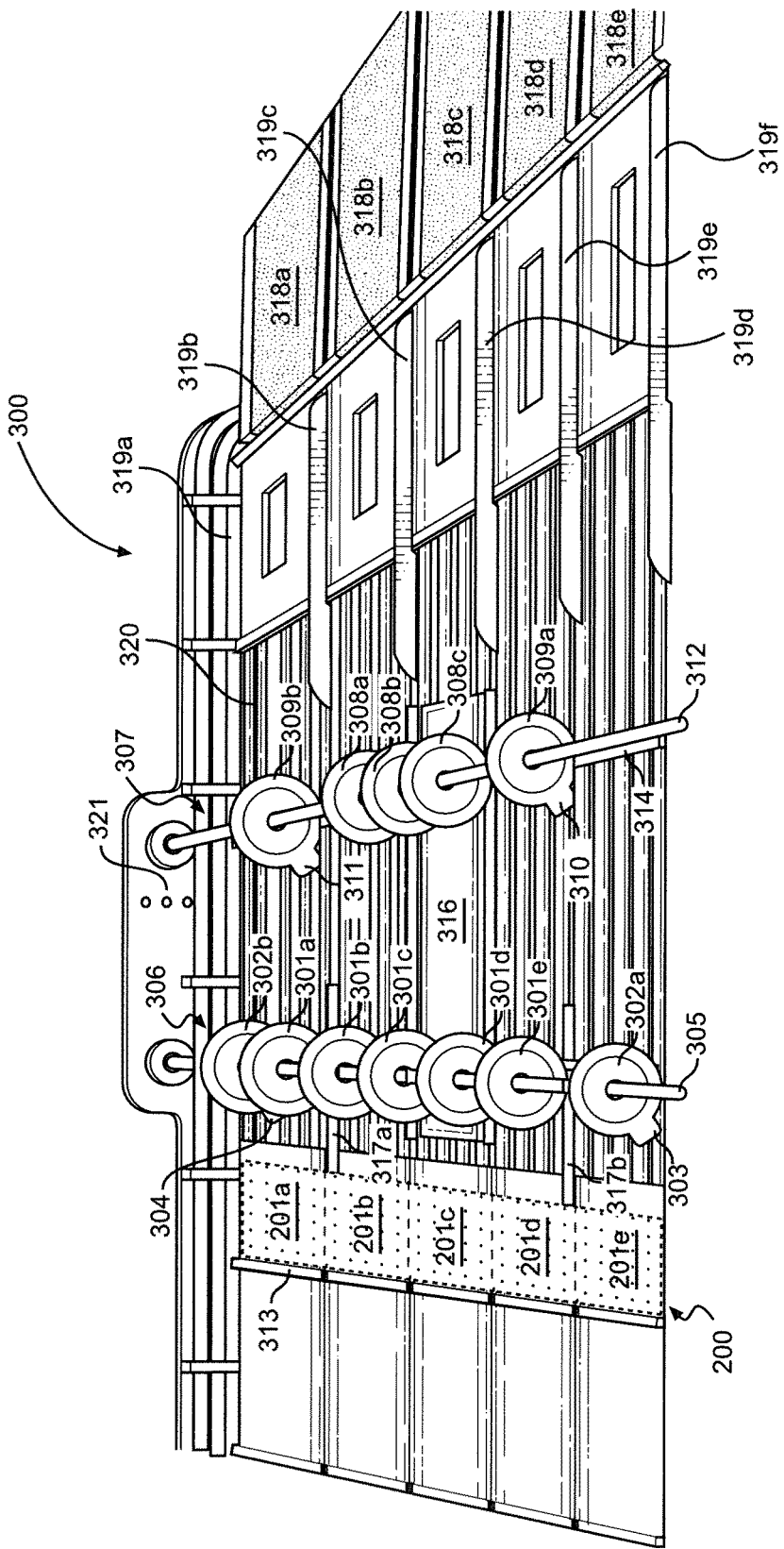
FIG. 3A is a perspective view of a system to break the pizza sheet into individual pieces according to the invention.
Figure 3B:
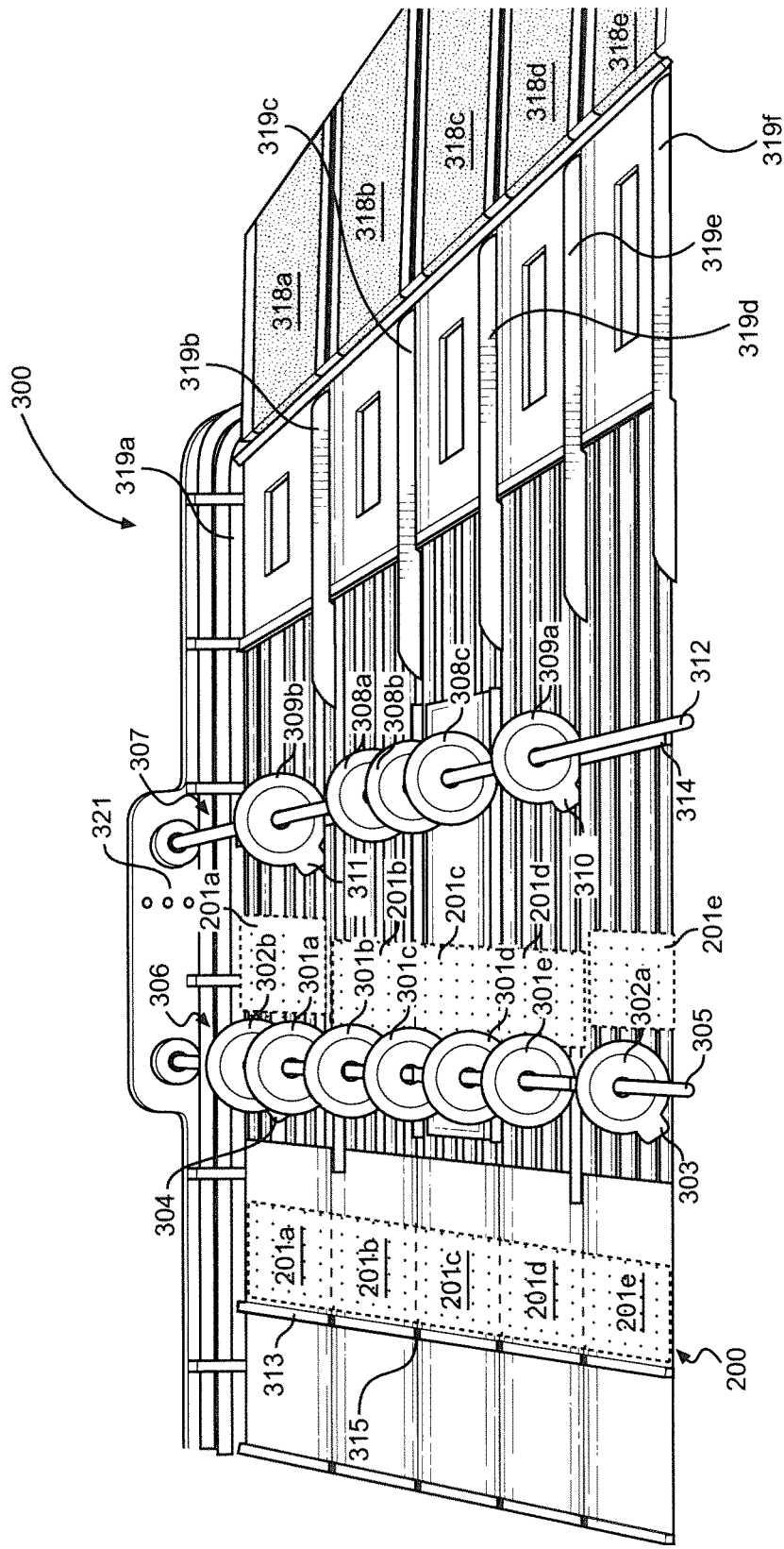
FIG. 3B is a perspective view of the system of FIG. 3A after a first breaking stage according to the invention.
Figure 3C:
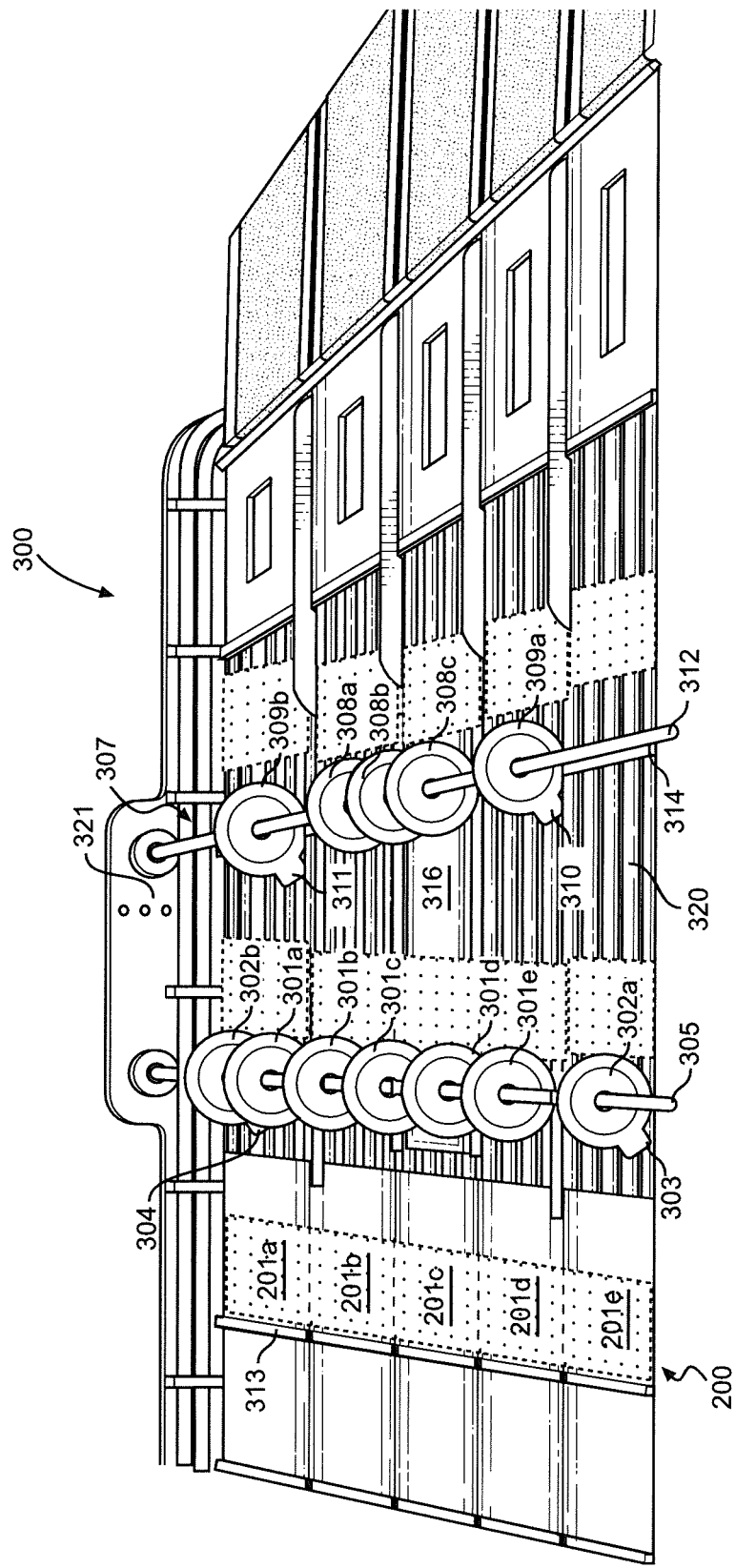
FIG. 3C is a perspective view of the system of FIG. 3A after a second breaking stage according to the invention.

The system and method for breaking individual pieces from frozen pizza sheet 200 will now be described with reference to FIGS. 3A-3E. FIGS. 3A-3C illustrate perspective side views of an exemplary system 300 at various steps or stages of the method of the invention. By way of example, pizza sheet 200, which includes five pizza pieces 201a, 201b, 201c, 201d and 201e to be broken off into individual pieces, is illustrated in FIGS. 3A-3C to be passing through system 300. System 300 comprises two sequential breaking mechanisms 306 and 307. First breaking mechanism 306 is employed to break off the end pieces 201a and 201e from pizza sheet 200, while second breaking mechanism 307, arranged downstream of first breaking mechanism 306, receives a pizza sheet that includes the three remaining pieces 201b, 201c and 201d and separates them into individual pieces. FIG. 3A illustrates the breaking process as pizza sheet 200 is entering below first breaking mechanism 306. FIG. 3B illustrates the breaking process as separated end pieces 201a and 201e, along with unbroken three center pieces 201b, 201c and 201d, are coming out of first breaking mechanism 306. FIG. 3C illustrates the breaking process at a point when the three unbroken center pieces 201b, 201c and 201d are being broken into individual pieces by second breaking mechanism 307.

In the embodiment shown in FIGS. 3A-3D, first breaking mechanism 306 includes five holding wheels 301a, 301b, 301c, 301d and 301e mounted an axle 305. Holding wheels 301a, 301b, 301c, 301d and 301e apply downward holding pressure at various locations of pizza sheet 200 substantially in the area covered by the individual pieces 201b, 201c and 201d. Also mounted on axle 305 are a pair of cammed wheels 302a and 302b. Cammed wheel 302a includes a cam 303, while cammed wheel 302b includes a cam 304. As pizza sheet 200 passes underneath first breaking mechanism 306 in FIG. 3A, system 300 is designed such that cam 303 of cammed wheel 302a applies a direct downward breaking pressure to piece 201e. Similarly, cam 304 of cammed wheel 302b applies a direct downward breaking pressure to piece 201a. The timing of the pressure by cams 303 and 304 is achieved through a controller and/or any suitable electronics well known in the art, and therefore are not described separately. A driving mechanism to rotate holding wheels 301a, 30b, 301c, 301d and 301e, and breaking wheels 302a and 302b is generally labeled as 321. Driving mechanism 321 may include any prime mover known in the art, for example an electric motor. The combination of holding pressure applied by one or more of holding wheels 301a, 301b, 301c, 301d and 301e and the breaking pressure applied by cam 304 causes the end piece 201a to break off at frangible line 202a. Simultaneously, at the other end of pizza sheet 200, the combination of holding pressure applied by one or more of holding wheels 301a, 301b, 301c, 301d and 301e and the breaking pressure applied by cam 303 causes the other end piece 201e to break off at frangible line 202d.

To aid the breaking process, pizza sheet 200 is provided with cantilevered support from one or more horizontal bars arranged below pizza sheet 200. In the exemplary embodiment shown in FIGS. 3A-3D, three horizontal bars 316, 317a and 317b are provided. Horizontal bar 317a provides a cantilevered support substantially along or closely adjacent and parallel to frangible line 202a and horizontal bar 317b provides support substantially along or closely adjacent and parallel to frangible line 202d. In other words, horizontal bar 317a suspends end piece 201a to freely allow for a downward movement of end piece 201a when a downward breaking pressure is applied by cam 304. At the other end, horizontal bar 317b suspends end piece 201e to freely allow for a downward movement of end piece 201e when a downward breaking pressure is applied by cam 303. However, horizontal bars 316, 317a and 317b restrict downward movement of three center three pieces 201b, 201c and 201d. The combination of downward pressure provided by holding wheels 301a, 301b, 301c, 301d and 301e and the upward support provided by horizontal bars 316, 317a and 317b substantially restricts the vertical movement of the three center pieces 201b, 201c and 201d. Therefore, as cam 304 applies a downward breaking pressure to end piece 201a, end piece 201a moves downwards while the central pieces 201b, 201c and 201d are vertically restricted from moving. Frozen pizza sheet 200, as mentioned above, is not flexible as a freshly prepared pizza but rather brittle and has to break to accommodate the downward movement of end piece 201a. The line of breakage is established by frangible line 202a. Similarly, at the other end, as cam 303 applies a downward breaking pressure to end piece 201e, end piece 201e moves downwards while the three center pieces 201b, 201c and 201d are vertically restricted from moving. As frozen pizza sheet 200 is brittle, pizza sheet 200 is caused to break at frangible line 202d to establish individual end piece 201e.

To push pizza sheet 200 onto the first breaking mechanism 306, horizontal push bars 313 are provided. The height of the horizontal push bars 313 is designed to impart an optimal push force to pizza sheet 200. Push bars 313 can be driven by any mechanism known in the art, such as an electric motor. Push bars 313 include gaps, such as shown as 315, to accommodate the horizontal bars 316, 317a and 317b that provide cantilever support to pizza sheet 200 or the portions thereof. A series of spaced horizontal bars, denoted by reference numeral 320, provide a spaced surface for the pizza sheet 200 and individual pieces to move. Spaced bars 320 allow cheese, topping, crumbs or any other material coming off during the breakage to drop below and therefore not create obstructions from accumulation.

Once the breaking process of pizza sheet 200 starts, portions of unbroken pizza sheet 200 and individual pieces are pushed forward by push bars 314. Push bars 314 include gaps, analogous to those in push bars 313, to accommodate the horizontal bars 316, 317a and 317b that provide cantilever support to pizza sheet 200 or the portions thereof. After pizza sheet 200 has been broken down into three pieces, i.e., individual pieces 201a and 201e, and a combined piece consisting 201b, 201c and 201d, all of these pieces are pushed forward toward second breaking mechanism 307 by push bars 314. As with push bars 313, push bars 314 can be driven by any mechanism known in the art, and therefore such mechanism will not be described in detail herein. Although two distinct push bars 313 and 314 are illustrated and described, common push bars could be employed to accomplish the functions of both 313 and 314.

Second breaking mechanism 307, as also illustrated in detail in FIG. 3E, is arranged downstream of first breaking mechanism 306. Because it has to break a shorter pizza sheet with a fewer number of individual pieces, second breaking mechanism 307 may have fewer holding wheels compared to first breaking mechanism 306. In the example shown in FIGS. 3A-3C and 3E, second breaking mechanism 307 is used to separate pieces 201b and 201d from piece 201c. For that purpose, second breaking mechanism 307 includes three holding wheels 308a, 308b and 308c, all mounted for concurrent rotation on a common rotatable axle 312. Holding wheels 308a, 308b and 308c function to apply downward pressure generally on the area of middle piece 201c. Second breaking mechanism 307 further comprises two cammed wheels 309a and 309b, disposed on either side of the group of holding wheels 308a, 308b and 308c. More particularly, cammed wheel 309a is adjacent to holding wheel 308c and cammed wheel 309b is adjacent to holding wheel 308a. Cammed wheel 309a includes a cam 310 and cammed wheel 309b includes a cam 311. Upon rotation of axle 312, cam 310 will be caused to apply a direct downward breaking pressure on individual piece 201d to break pieces 201d from 201c along frangible line 202c. Similarly, cam 311 applies a direct and downward breaking pressure on individual piece 201b to break piece 201b from piece 201c along frangible line 202b. Therefore, after pizza sheet 200 has passed through second breaking mechanism 307, three additional, individual pieces 201b, 201c and 201d will emerge. The timing of the pressure provided by the cams 310 and 311 is achieved through a controller and/or any suitable electronics, all well known in the art, and therefore not described separately. Similarly, as mentioned above, driving mechanism 321 to drive holding wheels 308a, 308b and 308c, along with cammed breaking wheels 309a and 309b, may be constituted by any prime mover known in the art, such as an electric motor.

Horizontal bar 316 extends from underneath the first breaking mechanism 306 until downstream of second breaking mechanism 307, as best illustrated in FIG. 3A. The cantilevered support provided by horizontal bar 316 is substantially along the midline of pizza sheet 200, more particularly along the midline of center piece 201c. Therefore, horizontal bar 316 provides an upward support only for center piece 201c. This upward support, combined with downward pressure exerted by holding wheels 308a, 308b and 308c, substantially restricts vertical movement of center piece 201c. When cam 311 applies a downward breaking pressure to end piece 201b of shortened pizza sheet 200, end piece 201b moves downward. At the other end, when cam 310 applies downward pressure to end piece 201d, end piece 201d moves downwards. The frozen pizza, being brittle, does not have enough flexibility to accommodate these downward pressures without a breakage. Therefore, shortened pizza sheet 200 breaks off at frangible lines 202b and 202c. The breakage along frangible lines 202b and 202c separates individual pieces 201b and 201d from piece 201c.

Therefore, as a result of pizza sheet 200 passing through both of the first breaking mechanism 306 and second breaking mechanism 307, five individual pieces 201a, 201b, 201c, 201d and 201e emerge. These individual pieces 201a, 201b, 201c, 201d and 201e are pushed onto their respective conveyer belts 318a, 318b, 318c, 318d and 318e (particularly see FIGS. 3A and 3B) by push bars 314. More specifically, piece 201a is aligned with conveyer belt 318a by alignment bars 319a and 319b; piece 201b is aligned with conveyor belt 318b by alignment bars 319b and 319c; piece 201c is aligned with conveyer belt 318c by alignment bars 319c and 319d; piece 201d is aligned with conveyor belt 318d by alignment bars 319d and 319e; and piece 201e is aligned with conveyor belt 318e by alignment bars 319e and 319f. Conveyer belts 318a, 318b, 318c, 318d and 318e transport the respective pizza pieces 201a, 201b, 201c, 201d and 201e to the appropriate wrapping and/or packaging locations.

Figure 4:
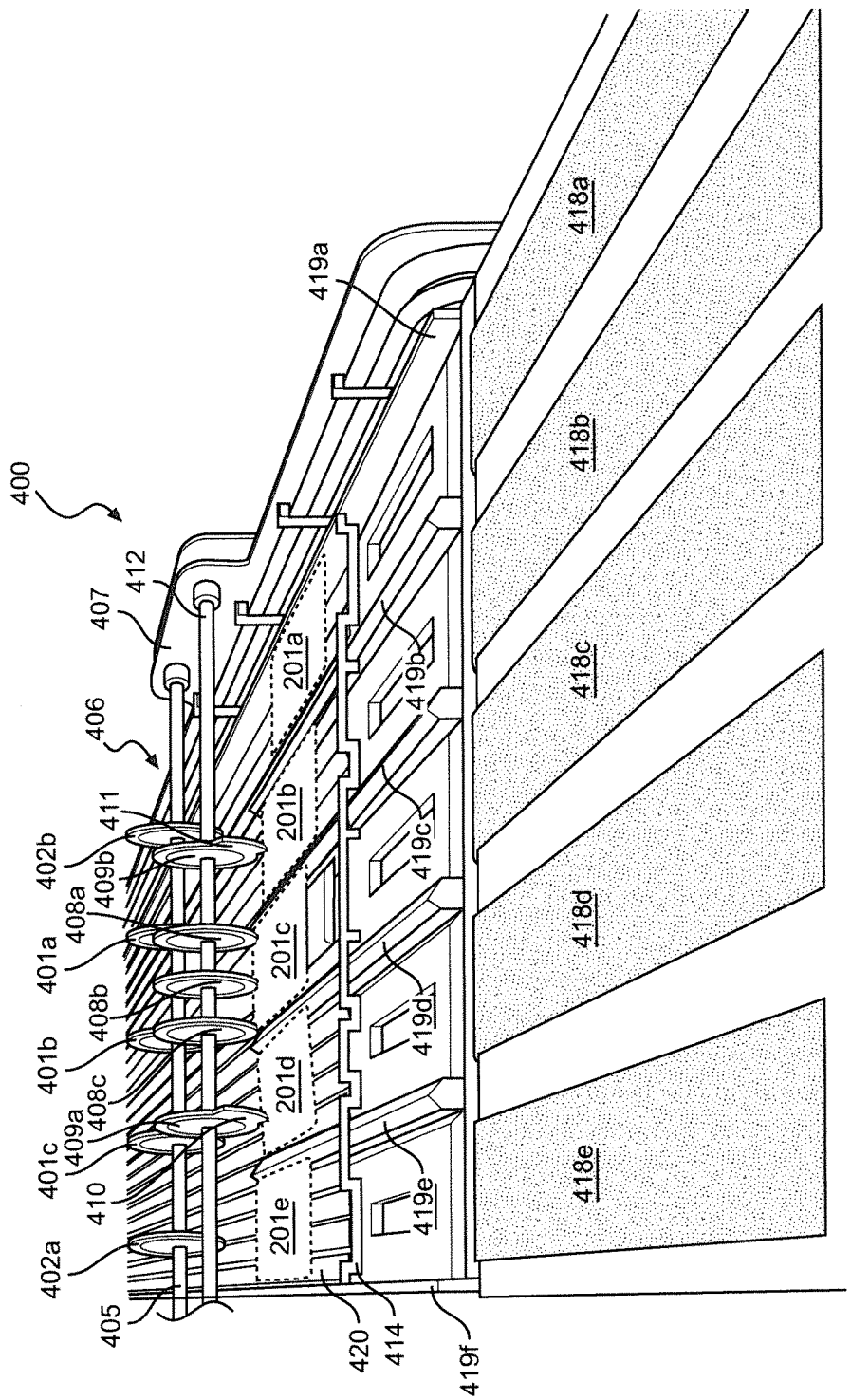
FIG. 4 illustrates a perspective view of another exemplary system, according to various embodiments of this invention.

At this point, it should be noted that various changes and/or modifications can be made to the above described structure and operation without departing from the invention. For instance, FIG. 4 presents a perspective view of a modified embodiment of a system 400, similar to above described system 300, including a first breaking mechanism 406 and second breaking mechanism 407 arranged downstream of first breaking mechanism 406. However, in contrast to system 300 which includes five holding wheels in first breaking mechanism 306, system 400 only includes three holding wheels 401a, 401b and 401c mounted to a common and rotatably driven axle 405. Also mounted for concurrent rotation on axle 405 are cammed wheels 402a and 402b, each including a cam which is hidden from view in this perspective. Second breaking mechanism 407 shown here is similar to the second breaking mechanism 307 shown in FIG. 3. As with second breaking mechanism 307 of system 300, second breaking mechanism 407 includes three holding wheels 408a, 408b and 408c and two cammed wheels 409a and 409b, all mounted on the same rotatably driven axle 412. Cammed wheel 409a includes a cam 410 and cammed wheel 409b includes a cam 411. The perspective view of system 400 shows cammed wheels 409a and 409b breaking off individual pieces 201d and 201b respectively from center piece 201c. Therefore, as a result of pizza sheet 200 passing through both of the first breaking mechanism 406 and second breaking mechanism 407, five individual pieces 201a, 201b, 201c, 201d and 201e emerge. These individual pieces 201a, 201b, 201c, 201d and 201e are pushed onto their respective conveyer belts 418a, 418b, 418c, 418d and 418e by push bars 414. More specifically, piece 201a is aligned with conveyer belt 418a by alignment bars 419a and 419b; piece 201b is aligned with conveyor belt 418b by alignment bars 419b and 419c; piece 201c is aligned with conveyer belt 418c by alignment bars 419c and 419d; piece 201d is aligned with conveyer belt 418d by alignment bars 419d and 419e; and piece 201e is aligned with conveyer belt 418e by alignment bars 419e and 419f. Conveyer belts 418a, 418b, 418c, 418d and 418e transport the respective pizza pieces 201a, 201b, 201c, 201d and 201e to the appropriate wrapping and/or packaging locations. As with system 300, system 400 includes a series of spaced horizontal bars, denoted by reference numeral 420, that provide a spaced surface for the pizza sheet 200 and individual pieces to move. Spaced bars 420 allow cheese, topping, crumbs or any other material coming off during the breakage to drop below and therefore not create obstructions from accumulation. FIG. 4 also illustrates individual pieces of pizza at various stages. This exemplary illustration particularly underscores that system 400 follows an assembly line approach to production, as does exemplary system 300. Although pizza sheet 200 is broken into five individual pieces in two stages, it does not mean that system 400 must wait until both stages for pizza sheet 200 are completed to start breaking off a subsequent pizza sheet. As one pizza sheet 200 moves onto the second stage, a subsequent pizza sheet can undergo a first stage of breakage. Such assembly line approach vastly improves the speed and efficiency of the production process. In any case, the invention is only intended to be limited by the scope of the following claims.

The invention claimed is:

1. A system to break a sheet of frozen pizza into individual pieces, the system comprising a breaking mechanism including:
   at least one holding wheel mounted on a rotatable axle, said at least one holding wheel being configured to apply a downward holding pressure to a portion of the sheet of frozen pizza; and
   at least one cammed wheel mounted also on the rotatable axle and spaced from the at least one holding wheel, said at least one cammed wheel including a cam, the system configured for the cam to apply a downward breaking pressure to break off an individual piece from a remainder of the sheet of frozen pizza.

2. The system of claim 1, further comprising a sheet of frozen pizza, wherein the sheet of frozen pizza includes at least one frangible line along which the break off occurs.

3. The system of claim 1, further comprising at least one support bar providing cantilevered support to at least a portion of the sheet of frozen pizza from underneath.

4. The system of claim 1, further comprising:
   at least one push bar including a first push bar which pushes the sheet of frozen pizza to each of the at least one holding wheel and the at least one cammed wheel; and
   a conveyor belt downstream of the breaking mechanism, wherein the at least one push bar includes a second push bar that pushes the individual piece onto the conveyer belt.

5. The system of claim 4, further comprising: at least one alignment bar to align the individual piece on the conveyer belt.

6. The system of claim 1, wherein the breaking mechanism constitutes a first breaking mechanism and the system further includes a second breaking mechanism which is arranged downstream of the first breaking mechanism and the second breaking mechanism also includes at least one holding wheel and at least one camming wheel mounted on a common rotatable axle for breaking off at least one additional individual piece from the remainder of the sheet of frozen pizza.

7. The system of claim 1, wherein the at least one cammed wheel has a radius projecting from the rotatable axle and the cam is a portion of the cammed wheel that projects a distance from the rotatable axle greater than the radius of a remaining round portion of the cammed wheel.

8. A system to break a sheet of frozen pizza into individual pieces, the system comprising:
   a first breaking mechanism including at least a first holding wheel and at least a first camming wheel, wherein the first holding wheel and the first camming wheel are mounted on a first common axle in a spaced relationship and wherein, the system is configured so that, upon directing the sheet of frozen pizza through the first breaking mechanism, the sheet of frozen pizza is supported by the first holding wheel while at least one individual piece is broken off of the sheet of frozen pizza by the first camming wheel upon rotation of the first common axle; and
   a second breaking mechanism arranged downstream of the first breaking mechanism, wherein the second breaking mechanism includes at least a second holding wheel and at least a second camming wheel, and wherein the second holding wheel and the second camming wheel are mounted on a second common axle wherein, upon directing a remainder of the sheet of frozen pizza from the first breaking mechanism through the second breaking mechanism, the remainder of the sheet of frozen pizza is supported by the second holding wheel while another individual piece is broken off of the remainder of the sheet of frozen pizza by the second camming wheel upon rotation of the second common axle.

9. The system of claim 8, wherein the first breaking mechanism further includes at least two additional first holding wheels and an additional first camming wheel constituting, along with the first camming wheel, a pair of first camming wheels, wherein the pair of first camming wheels is disposed on either side of the at least three first holding wheels.

10. The system of claim 9, wherein the second breaking mechanism further includes two additional second holding wheels and an additional second camming wheel constituting, along with the second camming wheel, a pair of second camming wheels, wherein the pair of second camming wheels is disposed on either side of the three second holding wheels.

11. The system of claim 10, wherein the sheet of frozen pizza is at least five individual pizza pieces wide, with the first breaking mechanism being configured to break off the at least one individual piece and the another individual piece of the sheet of frozen pizza and the second breaking mechanism being configured to break off two additional individual pieces from the remainder of the sheet of frozen pizza from the first breaking mechanism.

12. The system of claim 8, wherein the first and second holding wheels apply a downward holding pressure on portions of the sheet of frozen pizza during operation of the first and second breaking mechanisms.

13. The system of claim 8, further comprising:
a conveyor belt located downstream of the second breaking mechanism;
at least one alignment bar for orientating the at least one individual piece and the another individual piece relative to the conveyor belt; and
at least one push bar for pushing the at least one individual piece and the another individual piece onto the conveyor belt.

14. A method of breaking a sheet of frozen pizza into individual pieces, the method comprising:
holding down a portion of the sheet of frozen pizza by at least one holding wheel mounted for rotation with an axle;
applying a breaking pressure to the sheet of frozen pizza by a cam provided on at least one camming wheel mounted on the axle and spaced from the at least one holding wheel, in order to cause at least one individual piece to break off from the sheet of frozen pizza.

15. The method of claim 14, further comprising:
providing a support underneath the sheet of frozen pizza such that the at least one individual piece is cantilevered from a remainder of the sheet of frozen pizza.

16. The method of claim 14 further comprising:
pushing the sheet of frozen pizza to each of the holding wheel and the camming wheel by a first push bar of at least one push bar and further pushing the individual piece to a conveyer belt by a second push bar of the at least one push bar.

17. The method of claim 16, further comprising:
aligning the individual piece with the conveyer belt by at least one alignment bar.

18. The method of claim 14, wherein the at least one holding wheel comprises at least a first holding wheel and at least a second holding wheel, the at least one camming wheel comprises at least a first camming wheel and at least a second camming wheel, and wherein the holding and applying steps include:
passing the sheet of frozen pizza through a first breaking mechanism including at least the first holding wheel and at least the first camming wheel, wherein the first holding wheel and the first camming wheel are mounted on a first common axle and wherein, upon directing the sheet of frozen pizza through the first breaking mechanism, the sheet of frozen pizza is supported by the first holding wheel while the at least one individual piece is broken off of the sheet of frozen pizza by the first camming wheel upon rotation of the first common axle; and
thereafter passing a remainder of the sheet of frozen pizza through a second breaking mechanism arranged downstream of the first breaking mechanism, wherein the second breaking mechanism includes at least the second holding wheel and at least the second camming wheel, and wherein the second holding wheel and the second camming wheel are mounted on a second common axle wherein, upon directing the remainder of the sheet of frozen pizza from the first breaking mechanism through the second breaking mechanism, the remainder of the sheet of frozen pizza is supported by the second holding wheel while another individual piece is broken off of the remainder of the sheet of frozen pizza by the second camming wheel upon rotation of the second common axle.

19. The method of claim 18, wherein the at least one individual piece broken off by the first mechanism comprises two individual pieces such that the first breaking mechanism breaks the two individual pieces from the sheet of frozen pizza; and wherein the second breaking mechanism breaks the another piece and a further piece from the remainder of the sheet of frozen pizza.

20. The method of claim 18, wherein the first and second holding wheels apply a downward holding pressure on portions of the sheet of frozen pizza during operation of the first and second breaking mechanisms.

21. The method of claim 14, wherein the sheet of frozen pizza includes at least one frangible line along which the break off occurs.

* * * * *